March 17, 1970    J. C. JUREIT    3,501,181
DECORATIVE STRUCTURAL WOODEN JOINT
Filed Oct. 14, 1968
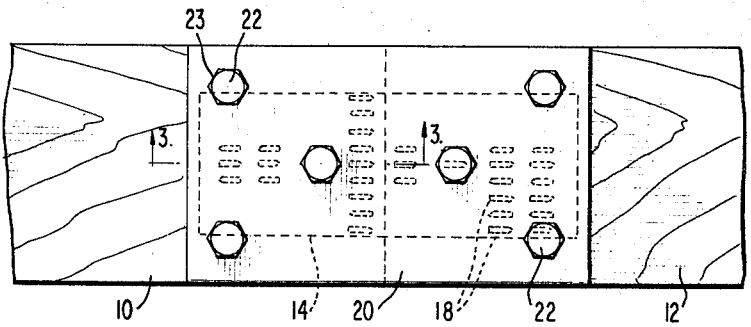
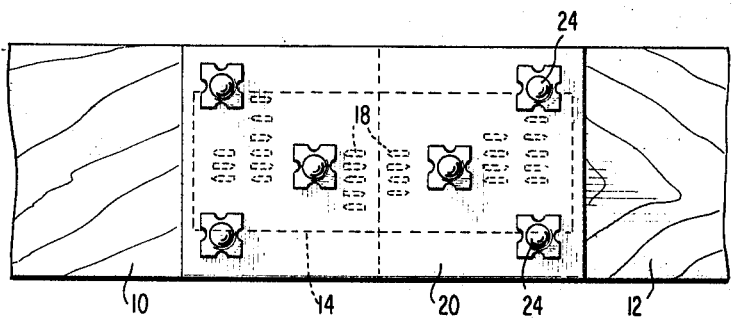
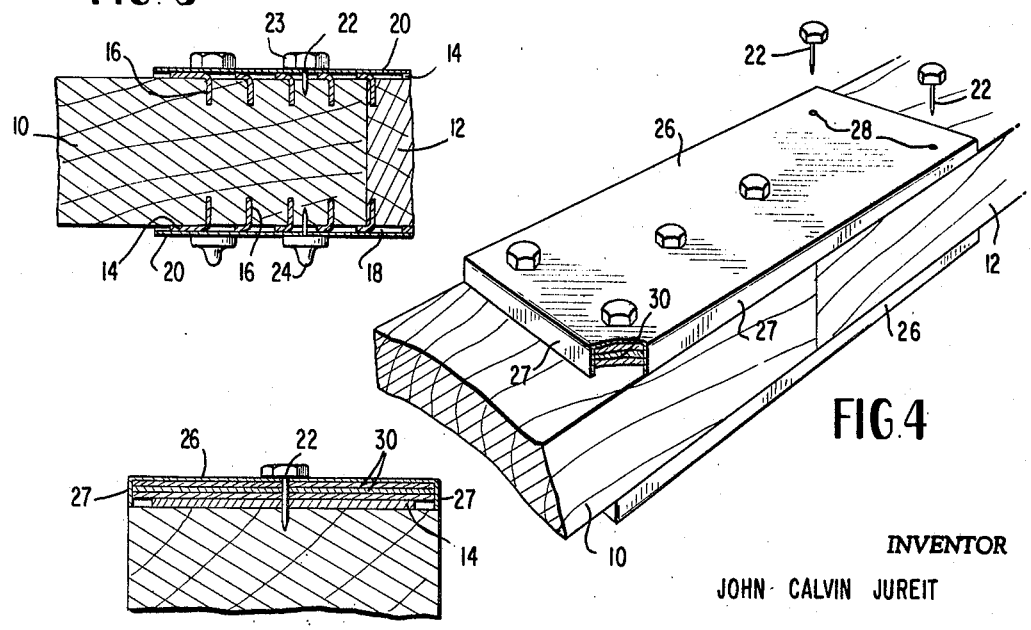
INVENTOR
JOHN CALVIN JUREIT
BY  *Le Blanc & Shur*
ATTORNEYS

# United States Patent Office 3,501,181
Patented Mar. 17, 1970

3,501,181
DECORATIVE STRUCTURAL WOODEN JOINT
John Calvin Jureit, Coral Gables, Fla., assignor to Automated Building Components, Inc., Miami, Fla., a corporation of Florida
Filed Oct. 14, 1968, Ser. No. 767,441
Int. Cl. E04c *3/00;* F16b *5/00, 7/00, 9/00*
U.S. Cl. 287—20.92                                   18 Claims

ABSTRACT OF THE DISCLOSURE

The decorative joint includes a pair of structural plates having a plurality of teeth struck normal thereto for embedment into opposite side faces of a pair of butting joint members. A decorative plate overlies each structural plate and portions of the butted members beyond the edges of the structural plate on each side of the joint, thereby blocking the sheet metal plate from view. Decorative nails are embedded into the joint members through the decorative plate and either the holes left by the struck teeth in the structural plate or directly into the wooden members beyond the lateral edges of the structural plate. To provide an appearance of thickness to the joint construction, a box-type decorative overlay may be provided.

---

The present invention relates to decorative plates used in conjunction with structural plates for use in exposed beam construction and the decorative structural wooden joints formed thereby. Particularly, the present invention relates to decorative plates formed to overlie structural plates having teeth struck therefrom and embedded into the members forming the joint whereby the unsightly appearance of the structural connection, including the structural plates, is blocked from view by decorative plates having the desired appearance, keeping the decor of the exposed beam construction and simulating a conventional heavy duty structural connection.

The joining of structural load-bearing wooden members has recently and significantly been advanced with the advent of structural wooden joints which are connected solely by means of metal plates having slender elongated nail-like teeth struck therefrom and embedded into opposite faces of the wooden members. An example of such structural plates is illustrated in U.S. Patent No. 2,877,520. Plates of this type, wherein the teeth thereof serve as the only means connecting the plates to the wooden members and the wooden members in adjoining relation, one to the other, have been widely employed in the wooden building construction industry, particularly in the formation of roof trusses. With the advent and current widespread use of exposed beam construction, particularly in residential housing and the construction of buildings such as restaurants, churches, and the like, it has not heretofore been the practice to employ such connector plates to join the members of the exposed beams since the appearance of the exposed sheet metal plates is not particularly pleasing from an aesthetic standpoint and is usually at variance with the aesthetic characteristics of the exposed beam construction. Moreover, some discoloration of these sheet metal structural plates inevitably occurs over extended periods of time and this further detracts from the appearance of the exposed beam construction. Painting or otherwise changing the appearance of the structural connecting plates per se has not proved effective in adapting structural connecting plates of this type to exposed beam construction.

The present invention provides an extremely low cost solution to this problem in a unique fashion whereby all of the advantages and features of structural joints formed by structural connector plates of the type previously described are retained while simultaneously there is provided a decorative joint having aesthetic characteristics which may be selected in keeping with the character of the exposed beam construction and which simulate conventionally employed connecting devices, such as plates bolted on opposite sides of the joint. To this end, the present invention provides connector plates of the type having teeth integrally struck therefrom for embodiment into the opposite side faces of the members of the joint and decorative plates of selected design, texture, etc., for overlying the structural connector plates and blocking the latter from view. Preferably, the decorative plates are slightly larger than the structural plates whereby face portions of the joint members beyond the edges of the structural connector plates are also covered. The decorative plates are preferably formed of aluminum sheet metal of suitable coloring and texture to provide a simulated heavy structural joint and are joined to the members of the joint by means of fasteners, preferably decorative fasteners, which simulate the appearance of heavy screws, nuts, or other type connectors, as desired.

In practice, the exposed beam structural joint is formed in the usual fashion, i.e., structural connector plates of the type having integrally struck teeth are disposed along opposite faces of the joint members and driven toward the members to embed the teeth into the members. As will be readily apparent, the structural joint thus formed would not have the pleasing desirable aesthetic characteristics corresponding with the decor of the exposed beam construction if left in this condition. To provide a decoration to the joint and give the appearance of or simulate a heavy connection between the members of the joint, decorative plates having the desired color, texture, etc., are secured in positions overlying the structural connector plates. Preferably, the decorative plates are oversize and also overlie marginal portions of the joint members extending beyond the edges of the structural plates. Decorative type nails simulating bolts, nuts, or other heavy duty fasteners of the type which might normally be used in exposed beam construction but for the use of connector plates, are nailed either through the decorative plate or through holes in the decorative plate into the wood either beyond the edges of the structural plates or through the slots left by the struck teeth of the structural plates. These decorative nails serve merely to fasten the the decorative plate to the joint as the decorative plate is not a structural member and does not increase the strength of the joint. It is thus apparent that the exposed beams can be joined, one to the other, by the connector plates in the usual fashion with all the advantages, features, etc., thereof accruing to the joint. The decorative plate can be readily and easily formed and applied to the joint in an extremely low cost manner with minimum labor merely by nailing the decorative plate over the structural plate. The decorative plate and fastening nails therefor may be provided in a variety of colors, decor, textures, etc., whereby the aesthetic characteristics of the joint can be selectively varied in keeping with the nature and character of the exposed beam construction, as well as to simulate a heavy duty connection.

In order to provide an appearance of extreme strength and thickness to the joint, a box-like decorative member having a selected thickness is employed in lieu of the sheet metal decorative member previously described. It will be apparent that the box-like member can have any desired thickness and preferably the interior of the box is filled with a stuffing material, for example, cardboard or the like, to prevent denting of its external exposed surface when the nails are hammered through the box securing it in a position overlying the structural connector plate and the marginal portions of the joint members about the structural plate similarly as the decorative plate previously described.

Accordingly, it is a primary object of the present invention to provide a decorative wooden structural joint of the type employing connector plates having integrally struck teeth.

It is another object of the present invention to provide a decorative structural wooden joint for use in exposed beam construction.

It is still another object of the present invention to provide a decorative structural joint of the type employing sheet metal connector plates having integrally struck teeth embedded into the members of the joint and over which decorative plates having selected color, texture, etc., are readily and easily applied.

It is a further object of the present invention to provide a decorative structural wooden joint construction which is low in cost, requires a minimum of labor, and which is readily and easily formed.

It is still a further object of the present invention to provide a decorative structural wooden joint which simulates a heavy duty structural joint and which provides the appearance of extreme strength and thickness.

It is a further object of the present invention to provide a decorative structural wooden joint for use in exposed beam construction wherein the usual heavy duty type fasteners, such as nuts, bolts and the like, are readily simulated to provide the appearance of a structural joint formed therewith.

These and further objects and advantages of the present invention will become more apparent upon reference to the following specification, claims, and appended drawings, wherein:

FIGURE 1 is a fragmentary side elevational view of a decorative structural wooden joint formed in accordance with the principles of the present invention;

FIGURE 2 is a fragmentary side elevational view of the joint of FIGURE 1 illustrating its opposite face;

FIGURE 3 is a fragmentary cross sectional view thereof taken about on line 3—3 of FIGURE 1;

FIGURE 4 is a fragmentary perspective view of the joint illustrating another form hereof; and FIGURE 5 is a fragmentary cross sectional view of the joint illustrated in FIGURE 4.

Referring now to FIGURES 1 and 2, there is illustrated the opposite sides of a joint comprising a pair of wooden joint members 10 and 12 secured in end to end butting relation, one to the other, by a pair of like connector plates 14 disposed along opposite side faces of members 10 and 12. It will be appreciated that members 10 and 12 may form a portion of an exposed beam construction, for example, in residential housing or in such buildings as churches, restaurants, and the like, and that the beams may be finished as by staining, painting or otherwise, as desired. It will be further appreciated that the beams 10 and 12 may be angularly related one to the other to form, for example, a peak joint.

Each of the connector plates comprises a sheet metal plate having a plurality of teeth 16 struck to extend at right angles to a side face for embedment into the substantially coplanar side faces of butting members 10 and 12. The plates may be similar to the plates described and illustrated in U.S. Patent No. 2,877,520 of common assignee herewith. Particularly, the teeth 16 hereof are preferably struck in longitudinal rows so as to leave corresponding slots 18 in the plate and extending from the teeth in a like direction in each longitudinal row of teeth. The teeth in next adjacent longitudinal rows of teeth are struck such that the slots left thereby in the plate extend from the teeth in opposite longitudinal directions. Connector plates 14 are preferably formed of 14 U.S. Standard gauge galvanized sheet metal although it will be appreciated that the plates may be formed of sheet metal having other thicknesses, for example, 18 or 20 U.S. Standard gauge sheet metal.

To form the joint hereof, the metal plates 14 are disposed on opposite sides of the joint members 10 and 12 with the teeth thereof directed toward members 10 and 12. The plates are then pressed toward the wooden members 10 and 12 as by a suitable press, not shown, such that the teeth thereof are embedded into opposite sides of members 10 and 12, thereby securing the latter, one to the other. This is usually accomplished at a prefabrication assembly site wherein the beam fabricating operation is semi-automatic with the use of heavy duty presses, conveyors, and other associated equipment, although it will be appreciated that portable presses, manual nailing, and other methods of securing the plates 14 to the joint members may be employed at the construction site. With the members 10 and 12 thus secured together, it will be seen that, in the absence of any decoration, covering or other decorative feature which would provide the nail plates with an appearance in keeping with the appearance of the beam construction and/or simulating a more conventional connection, the exposed side faces of the connector plates 14 would provide an unsightly appearance unsuitable for exposed beam construction. This is particularly true over extended periods of time during which the plates may be discolored through rusting or the like.

It is thus a significant feature of the present invention that the structural connector plates 14 are fully hidden from view by an overlying decorative plate which may be selectively formed to simulate the decor, appearance, texture, etc., of a heavy duty nut and bolt secured plate type fastener customarily employed in exposed beam construction. To this end, a pair of plates or covers 20, preferably formed of aluminum sheet material, are formed having lateral and longitudinal dimensions slightly larger than the corresponding lateral and longitudinal dimensions of the structural connector plates 14. Preferably, the lateral dimension of decorative plate 20 is such that it extends the full width of the members 10 and 12. As seen in FIGURES 1 and 2, the decorative plates 20 are disposed in overlying relation to the structural connector plates 14 such that the plates 20 extend beyond the lateral and end edges of connector plates 14 and overlie portions of members 10 and 12 beyond the edges of connector plates 14.

To secure the decorative plates 20 to the members of the joint in a manner in keeping with the decor, appearance, etc., of the exposed beam construction and to simulate a heavy duty type plate fastener, a plurality of fastener nails 22 are provided. The nails 22 have decorative heads which may simulate the usual types of heavy duty fasteners normally employed in conjunction with conventional connecting plates joining exposed beam members one to the other. For example, the nail heads, as seen in FIGURE 1, may be configured in the shape of bolts 23, while the nails on the opposite side of the joint, as seen in FIGURE 2, have heads formed to simulate nuts 24. The nut and bolt simulated nails 22 are disposed on opposite sides of the joint in transverse alignment one with the other in order to provide an appearance of a heavy duty bolt and nut connection through the joint members and their connector plates. The decorative nails 22, however, are substantially light nails or tacks sufficient only to retain the decorative plates 20 along opposite sides of the joint in position overlying connector plates 14. It will be noted that the nails 22 and the decorative plate 20 thus do not provide structural support or strength to the beam joint but rather such structural support is provided solely by the underlying and concealed connector plates 14.

To secure the decorative plates 20 at the joint face in position overlying connector plates 14, the nails 22 are either hammered through the sheet metal decorative plate 20 or through holes preformed through the plate 20 into the wooden members 10 and 12 either along the marginal portions beyond the lateral and end edges of connector plate 14 or through the slots 18 left by the teeth 16 struck from the structural connector plates 14. The nails 22 can thus be readily manually hammered into the members 10 and 12 such that the joint simulates a bolted plate construction.

In order to provide the appearance of an extremely strong and much heavier joint than previously described in connection with FIGURES 1-3, a thicker decorative covering can be applied to overlie the structural connector plates 14 and the portions of the joint about plates 14. To this end, a pair of boxes 26 (FIGURE 4) may be formed to the desired thickness of a suitable sheet metal, for example, aluminum. Boxes 26 may be formed from a sheet metal blank with the edges thereof bent over at right angles to form the end and side edges thereof. A plurality of holes 28 may be provided through the exposed side face of the box to receive the nails 22. The outer face of the box, including the side and end flanges 27, is provided with suitable coloring, texture, or the like, in keeping with the appearance of the exposed beam construction. Boxes 26 are applied to opposite sides of the joint in positions overlying the associated connector plates 14. The box is preferably filled with layers of cardboard or like stuffing material, indicated at 30, to avoid denting or otherwise damaging the outer exposed face of boxes 26 when the nails 22 are hammered therethrough into joint members 10 and 12. The boxes are applied similarly as before with the nails 22 being nailed either through the outer faces of the boxes or through the preformed holes 28 in such outer faces into the wood of the joint members either along the portions of the members beyond the edges of the associated structural plates 14 or through the slots left by the teeth of the associated plates 14 or both.

It will be appreciated that the boxes may be formed to any desired thickness and that they may be completely enclosed, i.e., by providing a side face opposite exposed outer side face opposite exposed outer side face by any suitable means. Alternatively, the inner edges of the side and end flanges 27 of each box may be turned inwardly to form a shoulder to retain sheets of cardboard or other suitable stuffing material within the box, thus facilitating packaging, handling and application of this form of decorative plate. It will thus be seen that the additional thickness afforded by this box-type construction readily simulates the appearance of a heavy duty strong joint between adjoining exposed beams while simultaneously the somewhat unsightly appearance of structural plates 14 is completely blocked from view and replaced by a decorative covering of selected decor in keeping with the aesthetic characteristics of the exposed beam construction.

It is apparent that the objects of the foregoing described invention are fully accomplished in that there is provided a decorative structural wooden joint which is extremely low in cost and which is readily and easily applied to the joint with a minimum of labor. Moreover, it will be seen that the decor of the decorative plate can be selected to match the decor of the exposed beam construction with various types of fasteners simulating nut and bolt connections or other types of fastening devices being employed to further enhance the decor of the joint, as well as to simulate a heavy duty strong joint. Moreover, where an appearance of extreme strength or thickness in the exposed beam joint is desired, the present invention provides a readily and easily formed and inexpensive box-type structure which can be secured to the joint in position overlying the structural connector plates in the same manner as in the previous form. Thus, the unsightly appearance of the butted joint, as well as the connector plates therefor, which would otherwise be fully exposed to view, can be completely covered with a decoration simulating a heavy duty and strong joint and this can be provided in keeping with the decor of the exposed beam construction.

The invention may be embodied in other specific forms without departing from the spirit or essential characteristics thereof. The present embodiments are therefore to be considered in all respects as illustrative and not restrictive, and all changes which come within the meaning and range of equivalency of the invention are therefore intended to be embraced thereby.

What is claimed and desired to be secured by United States Letters Patent is:

1. A decorative structural joint comprising: a pair of joint members disposed in substantially butting relation one to the other, means securing said members in butting relation one to the other including a structural connector plate having a plurality of teeth struck therefrom leaving a plurality of corresponding slots in said plate, said teeth being struck to extend from one side of said plate and being embedded into adjoining faces of said members, said connector plate providing substantially the entire structural strength of said joint; a substantially non-structural decorative covering having a decorative outer face; and means for securing said covering to said joint in overlying relation to said connector plate with the decorative outer face of said covering exposed, said covering blocking said plate including the slots thereof from view.

2. A joint according to claim 1 wherein said teeth comprise narrow elongated nail-like teeth leaving narrow elongated slots in said connector plate.

3. A joint according to claim 1 wherein said decorative covering comprises a plate having length and width dimensions slightly greater than the length and width dimensions of said connector plate, portions of said joint members about and beyond the edges of said connector plate underlying marginal portions of said decorative plate when the latter overlies said connector plate.

4. A joint according to claim 1 wherein said securing means includes a plurality of nails passing through said covering into said members.

5. A joint according to claim 4 wherein at least one of said nails passes through said covering and one of said slots in said connector plate into one of said joint members.

6. A joint according to claim 1 wherein said decorative covering comprises a plate having length and width dimensions slightly greater than the length and width dimensions of said connector plate, portions of said joint members about and beyond the edges of said connector plate underlying marginal portions of said decorative plate when the latter overlies the connector plate, said securing means including a plurality of nails having decorative heads and passing through said covering into said members, a portion of said nails being embedded into the portions of said members about and beyond the edges of said connector plate with at least one of said nails passing through a slot in said connector plate into one of said members.

7. A joint according to claim 1 wherein said means securing said covering to said joint includes simulated structural fasteners.

8. A joint according to claim 1 including a second structural connector plate, said second plate having a plurality of teeth struck therefrom leaving a plurality of corresponding slots in said plate, the teeth being struck to extend from one side of said second plate and being embedded into the adjoining faces of said members on the opposite side of said joint, said first and second connector plates providing substantially the entire structural strength of said joint, a substantially non-structural second decorative covering having a decorative outer face, and means for securing said second covering to said joint in overlying relation to said second connector plate with said latter mentioned decorative outer face of said second covering exposed, said covering blocking said second plate including the slots thereof from view.

9. A joint according to claim 8 wherein said means securing said first and second covering to said joint includes simulated structural fasteners.

10. A joint according to claim 9 wherein said first and second fasteners are secured in lateral alignment, each with the other, on opposite faces of the joint thereby to simulate a structural connection through said joint at each laterally aligned position.

11. A joint according to claim 10 wherein said first and second fasteners include nails having heads simulating nut and bolt fasteners.

12. A joint according to claim 8 wherein said first and second decorative coverings comprise first and second plates having length and width dimensions slightly greater than the length and width dimensions of their corresponding underlying connector plates, portions of said joint members on opposite faces thereof about and beyond the edges of the associated connector plates underlying marginal portions of the corresponding decorative plates.

13. A joint according to claim 12 wherein said securing means includes a plurality of nails having decorative heads and passing through the associated coverings into corresponding faces of said joint members, a portion of said nails being embedded into portions of said joint members underlying the marginal portions of the corresponding decorative plates with at least one nail on each side of the joint passing through a slot in the associated connector plate.

14. A joint according to claim 1 wherein said covering comprises a box having a side face portion and side and end walls, said box being secured in position overlying said connector plate with the side face portion being outwardly spaced from said connector plate.

15. A joint according to claim 14 including stuffing material in said box, said securing means including a plurality of nails passing through said box and said stuffing material into said members.

16. A joint according to claim 1 including a second connector plate, said second plate having a plurality of teeth struck therefrom leaving a plurality of corresponding slots in said plate, the teeth being struck to extend from one side of said second plate and being embedded into the adjoining faces of said members on the opposite side of said joint, a second decorative covering, said first and second decorative coverings comprising boxes having side face portions and side and end walls, said boxes being secured in position overlying the corresponding connector plates with the respective side face portions being outwardly spaced from the associated connector plates.

17. A joint according to claim 14 wherein said box has length and width dimensions slightly greater than the length and width dimensions of said connector plate, portions of said members about and beyond the edges of said conncetor plate underlying marginal portions of said box when the latter overlies the connector plate, the side and end walls of said box engaging said underlying portions of said joint members.

18. Decorative fasteners for joining structural members comprising; a structural connector plate having a plurality of teeth struck therefrom leaving a plurality of corresponding slots in said plate, said teeth being struck to extend from one side of said plate of embedment into the members of the joint, said plate being adapted to provide substantially the entire structural strength to the joint, a substantially non-structural decorative covering at least coextensive with said plate and having a decorative outer face, and means for securing said covering to the joint in overlying relation to the opposite side of said connector plate with the decorative outer face of said covering exposed, said covering blocking said plate including the slots thereof from view when said covering and said plate are secured to the joint members.

References Cited

UNITED STATES PATENTS

| 1,933,617 | 11/1933 | Dover | 85—53 |
| 3,090,088 | 5/1963 | Foley et al. | 85—13 X |
| 3,417,652 | 12/1968 | Menge | 85—13 |

FOREIGN PATENTS 750,602    1/1967    Canada.

RAMON S. BRITTS, Primary Examiner

U.S. Cl. X.R.

85—13